(12) United States Patent
Inagaki et al.

(10) Patent No.: US 8,915,672 B2
(45) Date of Patent: Dec. 23, 2014

(54) MOVABLE BREAKWATER AND METHOD OF OPERATING MOVABLE BREAKWATER

(75) Inventors: Hirofumi Inagaki, Tokyo (JP); Yasuhiro Iida, Tokyo (JP); Keiji Kanai, Tokyo (JP); Makoto Kobayashi, Tokyo (JP); Akira Sakaguchi, Nagoya (JP); Taro Arikawa, Yokosuka (JP); Hirohide Kimura, Tokyo (JP); Hisanobu Nagatomo, Tokyo (JP); Kazuyoshi Kihara, Tokyo (JP)

(73) Assignee: Mitsubishi Heavy Industries Bridge & Steel Structures Engineering Co., Ltd., Hiroshima-shi (JP)

( * ) Notice: Subject to any disclaimer, the term of this patent is extended or adjusted under 35 U.S.C. 154(b) by 272 days.

(21) Appl. No.: 13/376,146

(22) PCT Filed: Jun. 4, 2010

(86) PCT No.: PCT/JP2010/059507
§ 371 (c)(1),
(2), (4) Date: Dec. 2, 2011

(87) PCT Pub. No.: WO2010/140676
PCT Pub. Date: Dec. 9, 2010

(65) Prior Publication Data
US 2012/0076587 A1    Mar. 29, 2012

(30) Foreign Application Priority Data
Jun. 5, 2009  (JP) ................................. 2009-136075

(51) Int. Cl.
*E02B 3/06*    (2006.01)
(52) U.S. Cl.
CPC ........................................ *E02B 3/06* (2013.01)

USPC ................................ 405/25; 405/21; 405/107

(58) Field of Classification Search
CPC ............. E02B 3/06; E02B 3/062; E02B 3/04; E02B 3/102; E02B 7/26
USPC ........... 405/15, 21, 25, 107, 110, 111, 87, 92, 405/93, 96, 97, 104; 137/236.1; 251/25
See application file for complete search history.

(56) References Cited

U.S. PATENT DOCUMENTS 5,139,364 A * 8/1992 Takahashi et al. ............... 405/81

FOREIGN PATENT DOCUMENTS

| JP | 47-33618 | 8/1972 |
|---|---|---|
| JP | 55-4147 | 1/1980 |

(Continued)

OTHER PUBLICATIONS

English Translation of Written Opinion of the International Searching Authority for priority PCT/JP2010/059507; mailed Jan. 26, 2012, 8 pages.

(Continued)

*Primary Examiner* — Sean Andrish

(57) ABSTRACT

The present invention provides a movable breakwater that can do with a small amount of compressed air supplied to raise the buoyant steel pipe. The buoyant steel pipe 6 includes a buoyancy tank 6d in which gas is filled, an air chamber 6e provided above the buoyancy tank 6d, a penetration pipe 19 that penetrates through the buoyancy tank 6d and feeds compressed air supplied from a pressure accumulator tank 13 to the air chamber 6e, and an open chamber 6f, whose top side is open, provided above the air chamber 6e and in the buoyant steel pipe 6 at the upper end portion thereof.

12 Claims, 13 Drawing Sheets

(56) References Cited

FOREIGN PATENT DOCUMENTS

| | | | |
|---|---|---|---|
| JP | 62-273328 | | 11/1987 |
| JP | 04024309 | * | 1/1992 |
| JP | 10-37153 | | 2/1998 |
| JP | 2003-64654 | | 3/2003 |
| JP | 2004-116131 | | 4/2004 |
| JP | 2008-255719 | | 10/2008 |

OTHER PUBLICATIONS

Office Action and English Translation in counterpart Japanese application; Mar. 5, 2013, 7 pages.
International Search Report for PCT/JP2010/059507, ISA/JP, mailed Jul. 20, 2010.

* cited by examiner

MOVABLE BREAKWATER AND METHOD OF OPERATING MOVABLE BREAKWATER

CROSS-REFERENCE TO RELATED APPLICATIONS

This application is a U.S. National Stage Application of International application No. PCT/JP2010/059507, filed Jun. 5, 2010 and published in Japanese as WO/2010/140676 on Dec. 9, 2010. This application claims the benefit of Japanese Application No. 2009-136075, filed Jun. 5, 2009. The entire disclosures of the above applications are incorporated herein by reference.

TECHNICAL FIELD

The present invention relates to a movable breakwater capable of being raised and lowered.

BACKGROUND ART

Japanese Patent Application Laid-open Publication No. 2004-116131 (PTL 1) discloses a movable breakwater including a plurality of sleeved steel pipes inserted vertically penetrating through the concrete foundation provided at the seabed into the ground thereunder and arranged close together with the top faces thereof open to the concrete foundation surface as well, buoyant steel pipes inserted into the sleeved steel pipes in a manner capable of being raised and lowered as well as having the bottom faces thereof open and the top faces thereof closed, and an air charging system for supplying air into each buoyant steel pipe. With this structure, during a calm, the row of buoyant steel pipes are set under the seabed to leave the outside of the harbor and the harbor basin completely open, and during stormy weather, air is supplied into each buoyant steel pipe using an external air charging system such as a compressor and piping from the shore, making the row of buoyant steel pipes emerge out from the sea by buoyancy to prevent waves from intruding into the harbor basin.

SUMMARY OF INVENTION

Technical Problem

However, the movable breakwater disclosed in PTL1 requires a large amount of air to be fed within a short period of time to fill the buoyant steel pipes with air when raising the buoyant steel pipes. Therefore, there is a problem that a large air charging system or a large number of air charging systems must be used.

The present invention has been made in view of the above problem and an objective thereof is to provide a movable breakwater that can do with a small amount of compressed air supplied to raise the buoyant steel pipes.

Solution to Problem

An aspect of the present invention for achieving the objective above is a movable breakwater including a plurality of straightly aligned sleeved steel pipes inserted vertically penetrating a bottom of a water into a ground under the water with top faces thereof opened to the water, and buoyant steel pipes inserted into the respective sleeved steel pipes in a manner capable of being raised and lowered, the movable breakwater including an air chamber provided in each of the buoyant steel pipes at a position so that an upper end thereof is always under water level regardless of a raised/lowered position of the buoyant steel pipe, allowing water to come in and go out therefrom as well as being capable of storing compressed air, a buoyancy tank provided at a position under the air chamber in each of the buoyant steel pipes and at a position so that an upper end thereof is always under water level regardless of a raised/lowered position of the buoyant steel pipe, and having gas hermetically sealed therein, an air charging means for supplying compressed air to the air chamber; and an exhaust means positioned above the air chamber in each of the buoyant steel pipes, for exhausting compressed air in the air chamber out of the buoyant steel pipe, wherein the buoyant steel pipe is raised to emerge from water by buoyancy generated by supplying compressed air to the air chamber by the air charging means and buoyancy of gas in the buoyancy tank.

According to the present invention, a movable breakwater is provided with a buoyancy tank filled with gas and an air chamber capable of storing compressed air and therefore the buoyant steel pipes can be raised by buoyancy by the gas inside the buoyancy tank and buoyancy generated through supplying compressed air into the air chamber.

Further, since a buoyancy tank is provided in the buoyant steel pipes, the buoyant steel pipes can be raised by providing only a small amount of compressed air from a shore-based air charging means such as a pressure accumulator tank, compressor or the like. For this reason, the buoyant steel pipes can be raised within a short period of time.

And when the buoyant steel pipes are lowered, water existing in the buoyant steel pipe flows through the spaces between buoyant steel pipes and the sleeved steel pipes to be discharged into the sea, river or the like. Conventionally, when the buoyant steel pipes were lowered, the volumes of air existing inside the buoyant steel pipes were reduced by being compressed by water along with the lowering of the buoyant steel pipes. Therefore the amount of water discharged from the interior of the buoyant steel pipes were reduced making the flow rate of the water passing through the above-mentioned space were low. However, the buoyant steel pipes of the present invention are provided with buoyancy tanks having gas sealed therein, so the gas is not compressed by water when the buoyant steel pipes are lowered. Therefore, along with the lowering of the buoyant steel pipe, water in the buoyant steel pipe is discharged of an amount equivalent to the volume of the buoyancy tank, to flow between the buoyant steel pipes and the sleeved steel pipes at a high flow rate, enabling to generate a jet flow. And with this jet flow, sand, stones and the like existing between the buoyant steel pipes and the sleeved steel pipes can be removed.

In the present invention, the aforementioned air chamber being provided under the top of each of the aforementioned buoyant steel pipes, and the aforementioned buoyant steel pipe having hole, for discharging water that flows in from the top of the aforementioned buoyant steel pipe, located on the side face of the aforementioned buoyant steel pipe and above the aforementioned air chamber, allows the water in the buoyant steel pipe to be discharged out from the hole when the buoyant steel pipe is raised and the upper portion of the buoyant steel pipe emerges out from the water. Further, when the buoyant steel pipe is lowered, water can be made to flow through the hole into the buoyant steel pipe.

In the present invention, in the case the aforementioned buoyant steel pipe is to be placed at the sea or a mouth of a river, and the hole, for discharging water in the aforementioned air chamber is provided on the harbor basin side or the upstream side face of the aforementioned buoyant steel pipe, under the aforementioned air chamber, the movable breakwater according to the present invention is, for example, when placed in a harbor, has its air chamber in communication with the water in the harbor basin so that the air pressure within the air chamber becomes greatly influenced by the water level at the harbor basin side. For such reason, even when the water level outside the harbor decreases due to such as an undertow of a tsunami, the buoyant steel pipe can maintain the state emerging out from the water of a degree approximately the same as that before an undertow. Thus even when the water level outside the harbor becomes shallower by an undertow, the discharge of water to the outside of the harbor is only of a part that flows out from the space formed between adjacent buoyant steel pipes. Therefore the amount of water level decreased at the harbor basin is limited.

In the present invention, the aforementioned buoyant steel pipe may include at the bottom end part of an outer circumference thereof, a plate-like protruding portion to the buoyant steel pipe, of a thickness thinner than a space formed between the outer circumferential face of the aforementioned buoyant steel pipe and the inner circumferential face of the aforementioned sleeved steel pipe, and each of the respective sleeved steel pipes may include at the top end part of an inner circumference thereof, a plate-like protruding portion to the sleeved steel pipe, of a thickness thinner than the space formed between the outer circumferential face of the aforementioned buoyant steel pipe and the inner circumferential face of the aforementioned sleeved steel pipe.

According to the present invention, when the protruding portion to the buoyant steel pipe rises along with the rising of the buoyant steel pipe, the buoyant steel pipe abuts against the protruding portion to the sleeved steel pipe, and the protruding portion to the sleeved steel pipe restricts the protruding portion to the buoyant steel pipe from rising any further thus can stop the buoyant steel pipe from rising and prevent the buoyant steel pipe from sliding out as well.

In the present invention, in the case the aforementioned protruding portion to the buoyant steel pipe and the aforementioned protruding portion to the sleeved steel pipe are detachable from the aforementioned buoyant steel pipe and the aforementioned sleeved steel pipe, respectively, the protruding portions can be exchanged when the protruding portions deteriorate or break due to friction and the like.

In the present invention, the aforementioned air charging means may be provided with a feed pipe, connected to the side face at a bottom end portion of the aforementioned sleeved steel pipe in a manner such that one end thereof does not protrude into the aforementioned sleeved steel pipe, to transfer therethrough compressed air into the aforementioned buoyant steel pipe, and a supply device, connected to the feed pipe, to supply compressed air, the compressed air supplied by the supply device being supplied through the feed pipe to be discharged to the water in the aforementioned sleeved steel pipe and supplied to the aforementioned air chamber.

According to the present invention, when the supply device is operated to discharge compressed air into the water, the compressed air goes up the water into the buoyant steel pipe to be stored in the air chamber. At this time, when the feed pipe breaks in a state connected to the air chamber, the possibility of compressed air in the air chamber leaking out from the damaged part allowing the buoyant steel pipe to go down as in conventional cases, can be prevented, since the feed pipe and the air chamber is not connected.

In the present invention, in the case the aforementioned exhaust means is provided with an on-off valve and a feed pipe connected to one port of the aforementioned on-off valve for communication with the interior of the aforementioned air chamber, and the aforementioned air chamber is enabled to communicate with the atmosphere by opening the aforementioned on-off valve, the compressed air in the air chamber is discharged out from the buoyant steel pipe to allow the buoyant steel pipe emerging out from the water to descend.

In the method of operating a movable breakwater, the movable breakwater including a plurality of straightly aligned sleeved steel pipes inserted vertically penetrating the bottom of the water into the ground under the water with the top faces thereof opened to the water, and buoyant steel pipes inserted into the respective sleeved steel pipes in a manner capable of being raised and lowered, and further including an air chamber provided in each of the aforementioned buoyant steel pipes at a position so that the upper end thereof is always under the water level regardless of the raised/lowered position of the aforementioned buoyant steel pipe allowing water to come in and go out therefrom, as well as being capable of storing compressed air, a buoyancy tank provided at a position under the aforementioned air chamber in each of the aforementioned buoyant steel pipes and at a position so that an upper end thereof is always under the water level regardless of the raised/lowered position of the aforementioned buoyant steel pipe, and having gas hermetically sealed therein, an air charging means for supplying compressed air to the aforementioned air chamber, and an exhaust means positioned above the aforementioned air chamber in each of the aforementioned buoyant steel pipes for exhausting compressed air in the aforementioned air chamber out of the aforementioned buoyant steel pipe, the present invention is characterized to allow the aforementioned buoyant steel pipe to be raised to emerge from the water by buoyancy generated by supplying compressed air to the aforementioned air chamber by the aforementioned air charging means and the buoyancy of gas in the aforementioned buoyancy tank.

In the present invention, the aforementioned buoyant steel pipe may include at the bottom end part of an outer circumference thereof, a plate-like protruding portion to the buoyant steel pipe, of a thickness thinner than the space formed between the outer circumferential face of the aforementioned buoyant steel pipe and the inner circumferential face of the aforementioned sleeved steel pipe, and each of the respective sleeved steel pipes may include at the top end part of an inner circumference thereof, a plate-like protruding portion to the sleeved steel pipe, of a thickness thinner than the space formed between the outer circumferential face of the aforementioned buoyant steel pipe and the inner circumferential face of the aforementioned sleeved steel pipe, so that when the protruding portion to the buoyant steel pipe rises along with the rising of the buoyant steel pipe, the aforementioned protruding portion to the buoyant steel pipe abutting against the aforementioned protruding portion to the sleeved steel pipe, and the aforementioned protruding portion to the sleeved steel pipe restricting the aforementioned protruding portion to the buoyant steel pipe from rising any further to stop the aforementioned rising buoyant steel pipe and to prevent the aforementioned buoyant steel pipe from sliding out as well.

Additionally, in the present invention, each of the respective aforementioned sleeved steel pipe stores therein the aforementioned buoyant steel pipe by exhausting compressed air in the aforementioned air chamber and reducing the buoyancy in the aforementioned buoyant steel pipe.

Further in the present invention, in the case the rising speed of the aforementioned buoyant steel pipe increases along with reduction in water pressure acting on compressed air in the air chamber to increase volume of the compressed air in the air chamber, with rising of the aforementioned buoyant steel pipe, the aforementioned buoyant steel pipe can be raised in a short period of time.

Furthermore in the present invention, in the case the lowering speed of the aforementioned buoyant steel pipe increases along with increase in water pressure acting on compressed air in the air chamber to reduce volume of the compressed air in the air chamber, with lowering of the aforementioned buoyant steel pipe, the aforementioned buoyant steel pipe can be lowered within a short period of time.

CROSS-REFERENCE TO RELATED APPLICATIONS

The present application claims priority from Japanese Patent Application No. 2009-136075 filed on Jun. 5, 2009, which is herein incorporated by reference.

Advantageous Effects of Invention

With the present invention gas for raising the buoyant steel pipes can be permanently stored in the buoyant steel pipes. Therefore, the buoyant steel pipes can be raised by supplying a small amount of compressed air.

Further, after raising is completed, the buoyant steel pipes do not go down even in the unlikely event that the feed pipe breaks, so that the upper surfaces thereof can maintain predetermined levels.

DESCRIPTION OF EMBODIMENTS

A preferred embodiment of movable breakwater 1 according to the present invention will be discussed hereunder in detail with reference to the drawings.

Figure 1:
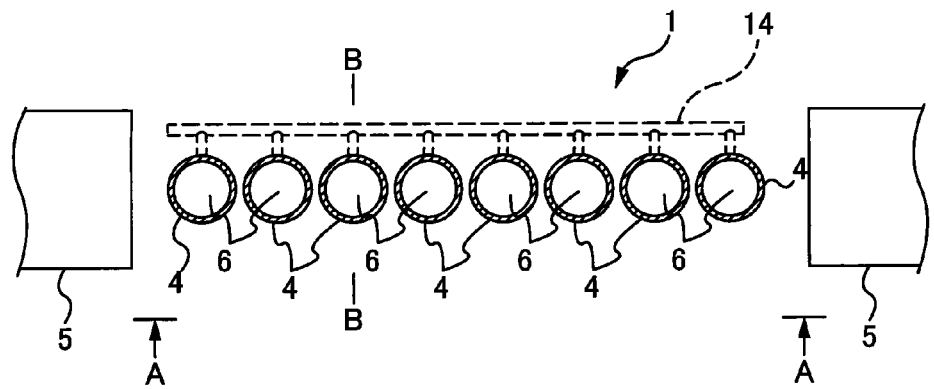
FIG. 1 is a planar diagram of the movable breakwater according to an embodiment of the present invention.

FIG. 1 is a planar diagram of a movable breakwater according to an embodiment of the present invention. Additionally, FIGS. 2 and 3 are sectional diagrams taken along lines A-A and B-B, respectively, of FIG. 1.

Figure 2:
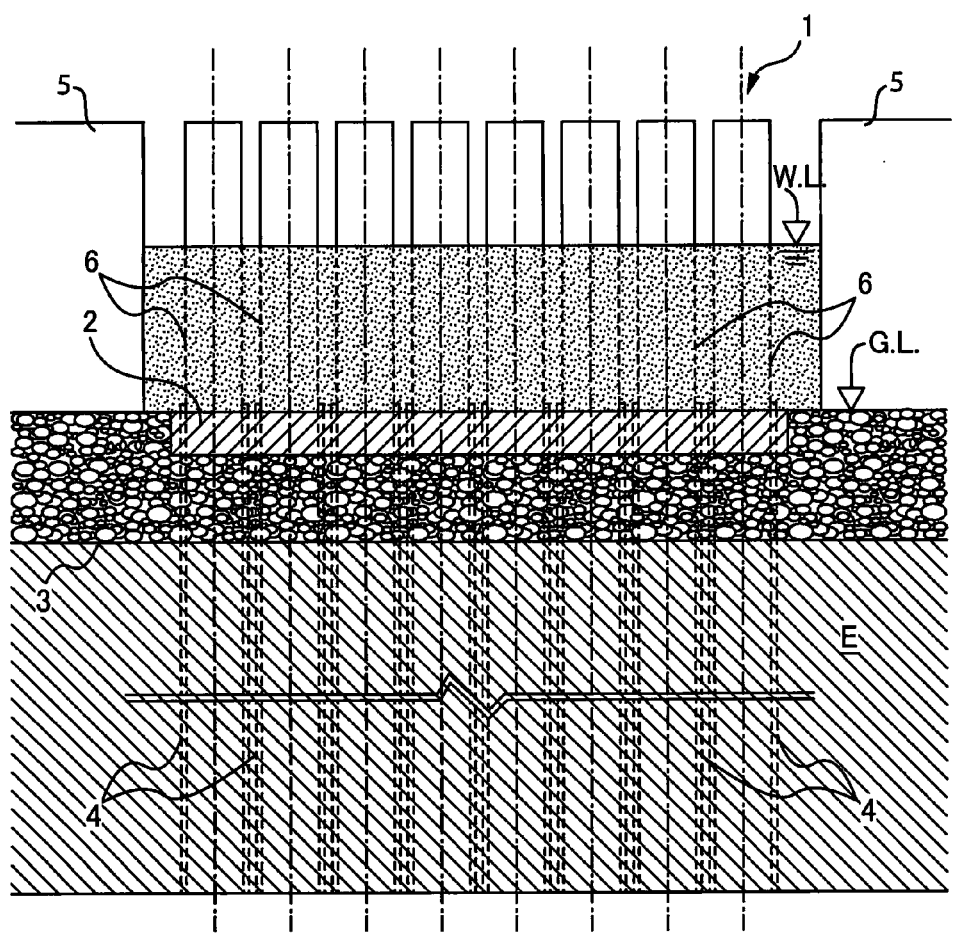
FIG. 2 is a sectional diagram taken along line A-A of FIG. 1.
Figure 3:
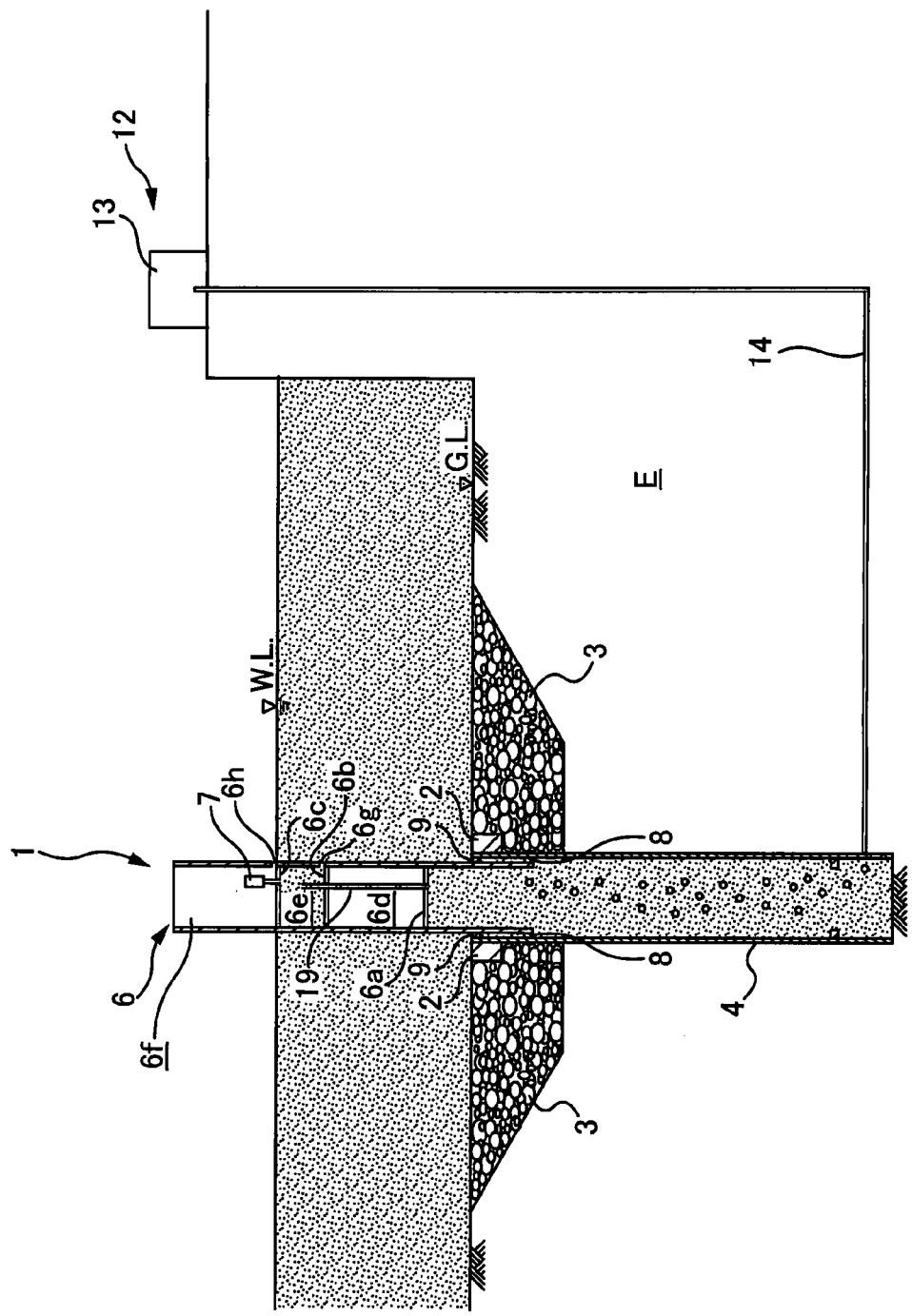
FIG. 3 is a sectional diagram taken along line B-B of FIG. 1.

As shown in FIGS. 1 to 3, in ground E under the water at the foot of the movable breakwater 1 partitioning the basin and outside of the harbor between quays 5, there is placed foundation concrete 2 of a predetermined thickness having the top end thereof in level with the ground under the water GL, with foot protection rocks 3 laid therearound. Sleeved steel pipes 4 penetrate vertically through this foundation concrete 2 and are buried in a straight line to reach a portion deep inside ground E under the water. Buoyant steel pipes 6 are inserted in a manner capable of being raised and lowered in these sleeved steel pipes 4.

An air charging system 12 configured with a pressure accumulator tank 13 used for supplying compressed air, and the feed pipe 14 for supplying compressed air into the air chamber 6e (discussed later) is provided at the shore near the movable breakwater 1. The feed pipe 14 is connected to a lower end part of the sleeved steel pipe 4 at the side face thereof so not to protrude into the interior of the sleeved steel pipe 4. And the compressed air supplied from the pressure accumulator tank 13 flows through the feed pipe 14 to be released in the water from the lower end part of the sleeved steel pipe 4, and to float up the water to be supplied into the air chamber 6e of the buoyant steel pipe 6.

A plate-like protruding portion to the buoyant steel pipe 8 of a thickness thinner than the space formed between the outer circumferential face of the buoyant steel pipe 6 and the inner circumferential face of the sleeved steel pipe 4 is detachably attached to the outer circumference of the buoyant steel pipe 6 at a lower end thereof.

Additionally, a plate-like protruding portion to the sleeved steel pipe 9 of a thickness thinner than the aforementioned space is detachably attached to the inner circumference of the sleeved steel pipe 4 at an upper end thereof.

When the protruding portion to the buoyant steel pipe 8 rises along with the rising of the buoyant steel pipe 6, the protruding portion to the buoyant steel pipe 8 abuts against the protruding portion to the sleeved steel pipe 9, and the protruding portion to the sleeved steel pipe 9 restricts the protruding portion to the buoyant steel pipe 8 from rising any further thus stopping the rising buoyant steel pipe 6 and preventing the buoyant steel pipe 6 from sliding out as well.

Figure 4:
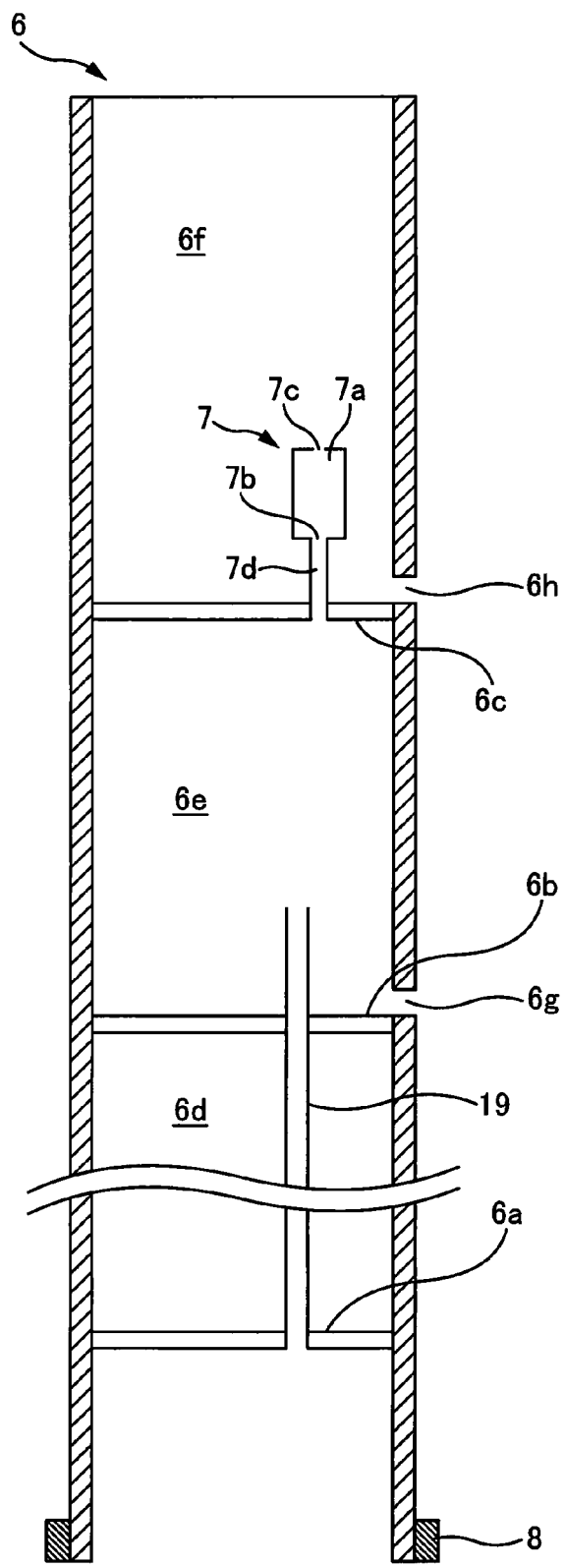
FIG. 4 is a vertical sectional diagram of a buoyant steel pipe.
Figure 5:
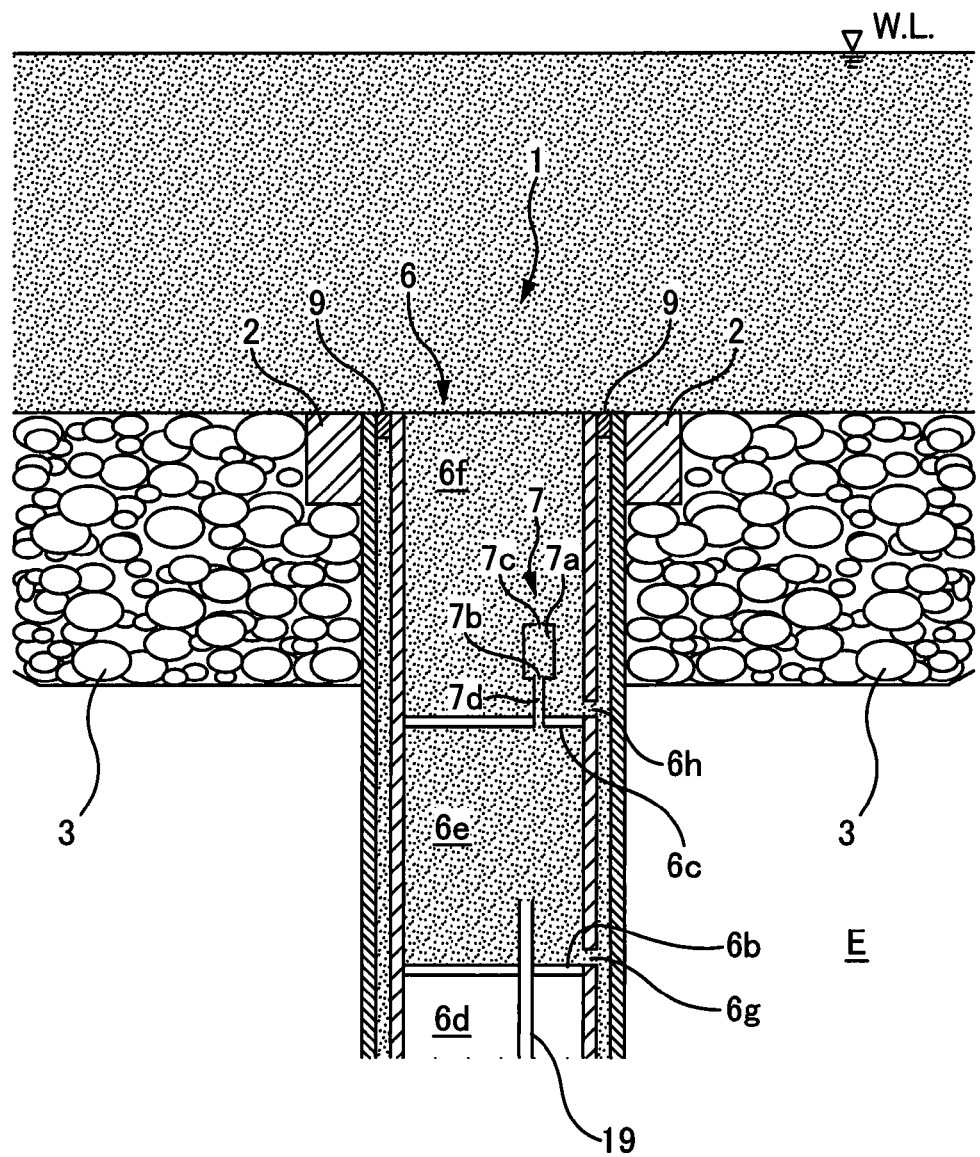
FIG. 5 is a vertical sectional diagram of a buoyant steel pipe in a state contained in a sleeved steel pipe.

FIGS. 4 and 5 are vertical sectional diagrams showing the buoyant steel pipe 6 and the buoyant steel pipe 6 in a state contained in the sleeved steel pipe 4, respectively.

As shown in FIGS. 4 and 5, the buoyant steel pipe 6 is a feature of the present invention and includes a buoyancy tank 6d in which gas is filled, an air chamber 6e provided above the buoyancy tank 6d, a penetration pipe 19 that penetrates through the buoyancy tank 6d to feed compressed air supplied from the pressure accumulator tank 13 into the air chamber 6e, and open an open chamber 6f, whose top side is open, provided above the air chamber 6e in the buoyant steel pipe 6 at the upper end portion thereof.

The buoyancy tank 6d is formed between partition walls 6a and 6b whose whole circumferences are joined by welding and the like to the inner circumferential face of the buoyant steel pipe 6 at lower portions thereof, and is hermetically sealed to avoid gas from flowing out.

The buoyancy tank 6d is provided at a location such that the top end of the buoyancy tank 6d is always below water level WL regardless of the raising/lowering of the buoyant steel pipe 6. Therefore, even when the buoyant steel pipe 6 is raised to its uppermost position emerging from the water, the buoyancy tank 6d of the present invention is positioned underwater so that buoyancy always acts on the buoyant steel pipe 6. The pressure, volume and the like in the buoyancy tank 6d is set so that this buoyancy is of a level such that the buoyant steel pipe 6 cannot rise by itself. Although air was filled in the buoyancy tank 6d in the present embodiment, the invention is not limited to such and other types of gas such as nitrogen may be used.

The air chamber 6e is formed between the partition walls 6c and 6b whose whole circumferences are joined by welding and the like to the inner circumferential face of the buoyant steel pipe 6. Further, a first hole 6g is provided at a lower portion of the air chamber 6e on the harbor basin side face thereof, allowing water to flow into and out from this air chamber 6e.

When compressed air supplied from the pressure accumulator tank 13 is supplied into the air chamber 6e, water stored in the air chamber 6e till then flows out into the water outside from the first hole 6g thereby gradually replacing the interior of the air chamber 6e with air. Then the buoyancy generated by gas in the buoyancy tank 6d and the buoyancy generated by the interior of the air chamber 6e being replaced by air, allows the buoyant steel pipe 6 to start rising.

The air chamber 6e is provided at a location such that the top end of the air chamber 6e is always under the water level WL regardless of the raising/lowering of the buoyant steel pipe 6. Therefore, the entire air chamber 6e is located under water and thereby the whole air volume in the air chamber 6e acts as buoyancy on the buoyant steel pipe 6.

A second hole 6h is provided at a lower portion on the side face of the open chamber 6f to discharge water stored in the open chamber 6f for the buoyant steel pipe 6 to rise smoothly when the buoyant steel pipe 6 is raised. Additionally, there is provided to the open chamber 6f, an exhaust means 7 including an on-off valve 7a and an exhaust feed pipe 7d whose one end is connected to one port 7b of the on-off valve 7a and the other end thereof penetrating the partition wall 6c to be in communication with the interior of the air chamber 6e. And this exhaust means 7 has the other port 7c of the on-off valve 7a kept open.

When the on-off valve 7a is opened when the buoyant steel pipe 6 is in a state emerging from the water (in other words when compressed air exists in the air chamber 6e), the air chamber 6e and the atmosphere communicates through the on-off valve 7a and the exhaust feed pipe 7d, thus allowing compressed air in the air chamber 6e to flow out into the atmosphere to reduce the buoyancy. And this reduction of buoyancy starts to lower the buoyant steel pipe 6, and therewith water flows through the first hole 6g provided at the lower side of the air chamber 6e into the air chamber 6e gradually replacing the compressed air in the interior of the air chamber 6e with water.

Explanation on the method of raising/lowering of the movable breakwater 1 will follow. In the present embodiment, description on the raising/lowering method will be explained in a case, after issuance of a tsunami warning, a tsunami occurs in the order of an undertow and a run up wave.

FIGS. 6 to 13 show the raised/lowered states of the movable breakwater 1.

Figure 6:
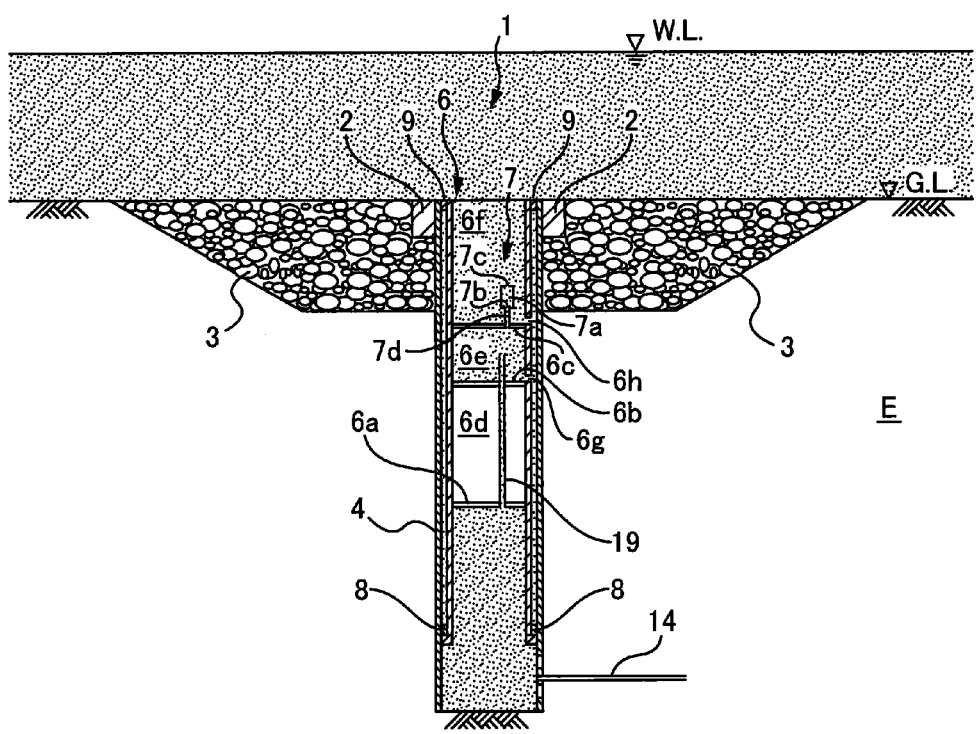
FIG. 6 is a diagram of a buoyant steel pipe in a raised/lowered state.

As shown in FIG. 6, normally, the buoyant steel pipe 6 is contained in the interior of the sleeved steel pipe 4 to completely open up the outside harbor and the harbor basin creating open water so that ships are allowed to come and go freely into and out of the harbor.

Note that there is buoyancy acting on the buoyant steel pipe 6 due to the gas inside the buoyancy tank 6d. However, the buoyant steel pipe 6 is sunk in the water to be contained inside the sleeved steel pipe 4 since this buoyancy is smaller than the weight of the buoyant steel pipe 6.

At this time, the open chamber 6f is filled with water since the top face of the buoyant steel pipe 6 is open. In addition, the on-off valve 7a is always at a closed state.

Figure 7:
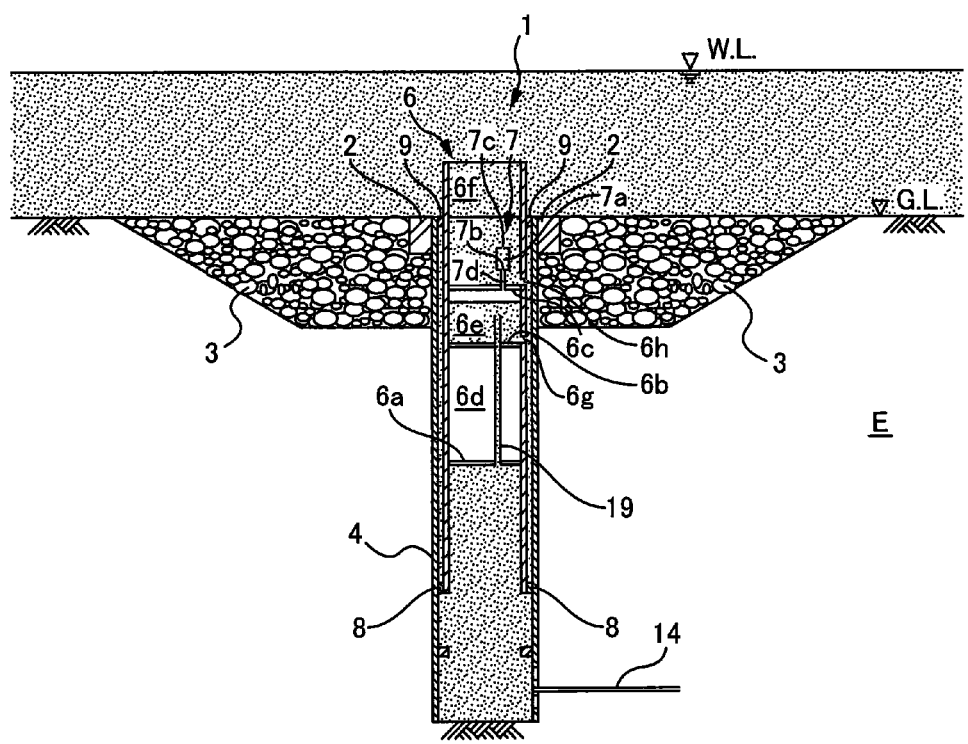
FIG. 7 is a diagram of a movable breakwater in a raised/lowered state.

As shown in FIG. 7, when a tsunami warning is issued, the pressure accumulator tank 13 is activated to discharge compressed air into the water at the bottom part of the sleeved steel pipe 4 to be supplied into the air chamber 6e. When compressed air is supplied to the air chamber 6e, water inside the air chamber 6e flows out through the first hole 6g to be discharged into the water outside being gradually replaced with compressed air. When compressed air continues to be supplied, buoyancy due to compressed air stored in the air chamber 6e and buoyancy due to gas inside the buoyancy tank 6d acting together as a rising force is increased to exceed the weight of the buoyant steel pipe 6, initiating the buoyant steel pipe 6 to rise.

Since the total amount of air required to raise the buoyant steel pipe 6 is predetermined, the buoyant steel pipe 6 can be raised by supplying a small amount of compressed air by filling in advance the buoyancy tank 6d with an amount of gas slightly less than the above total amount of air.

Further, water pressure acting on the air chamber 6e becomes lower since the depth of the air chamber 6e positioned in the surrounding water becomes shallower along with the raising of the buoyant steel pipe 6. Therefore, the volume of compressed air inside the air chamber 6e increases along with the raising of the buoyant steel pipe 6 so that buoyancy is effectively obtained allowing the buoyant steel pipe 6 to be raised quickly.

Figure 8:
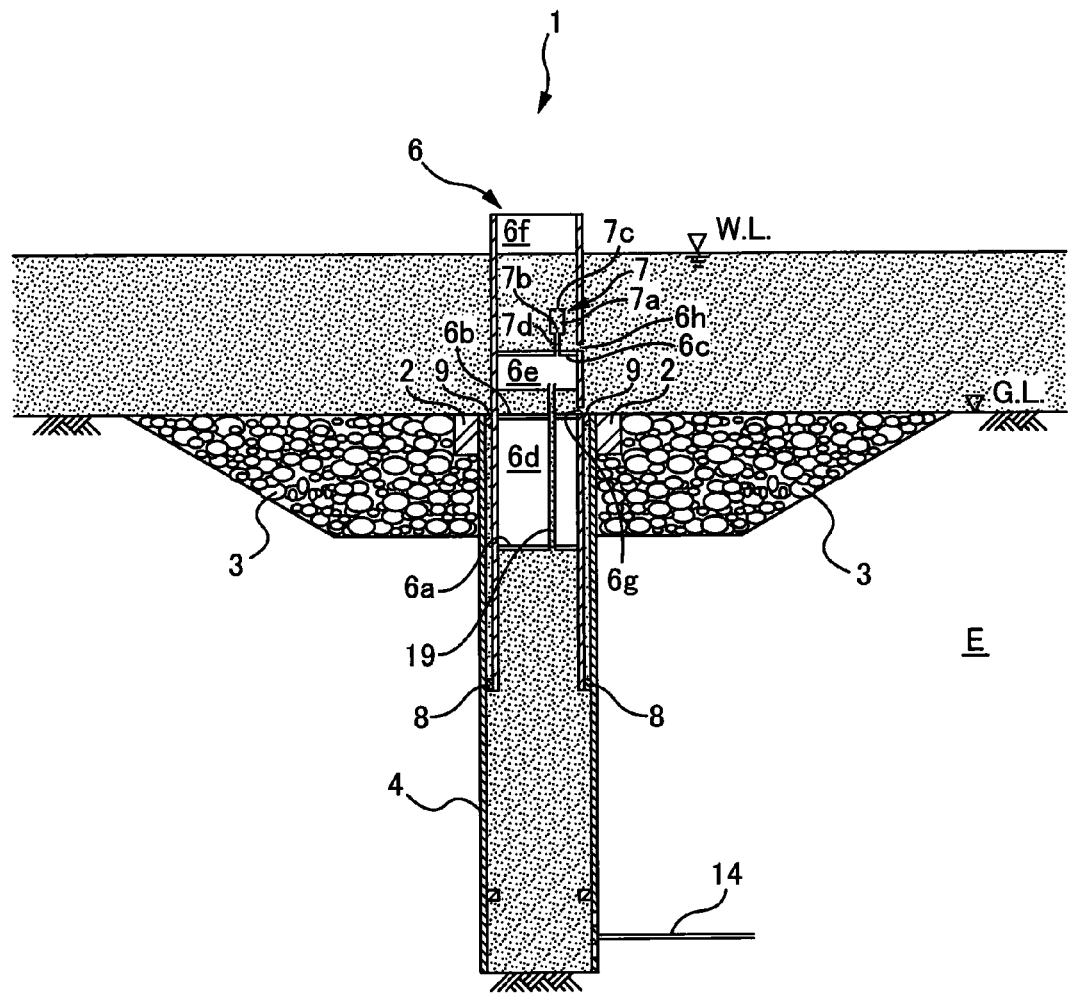
FIG. 8 is a diagram of a movable breakwater in a raised/lowered state.

As shown in FIG. 8, at the same time the buoyant steel pipe 6 starts to emerge from the water, water inside the open chamber 6f starts to be discharged through the second hole 6h out to the water outside. In this way, requirement for buoyancy of an amount equivalent to the weight of water stored in the open chamber 6f, at the time the buoyant steel pipe 6 is raised can be avoided.

Figure 9:
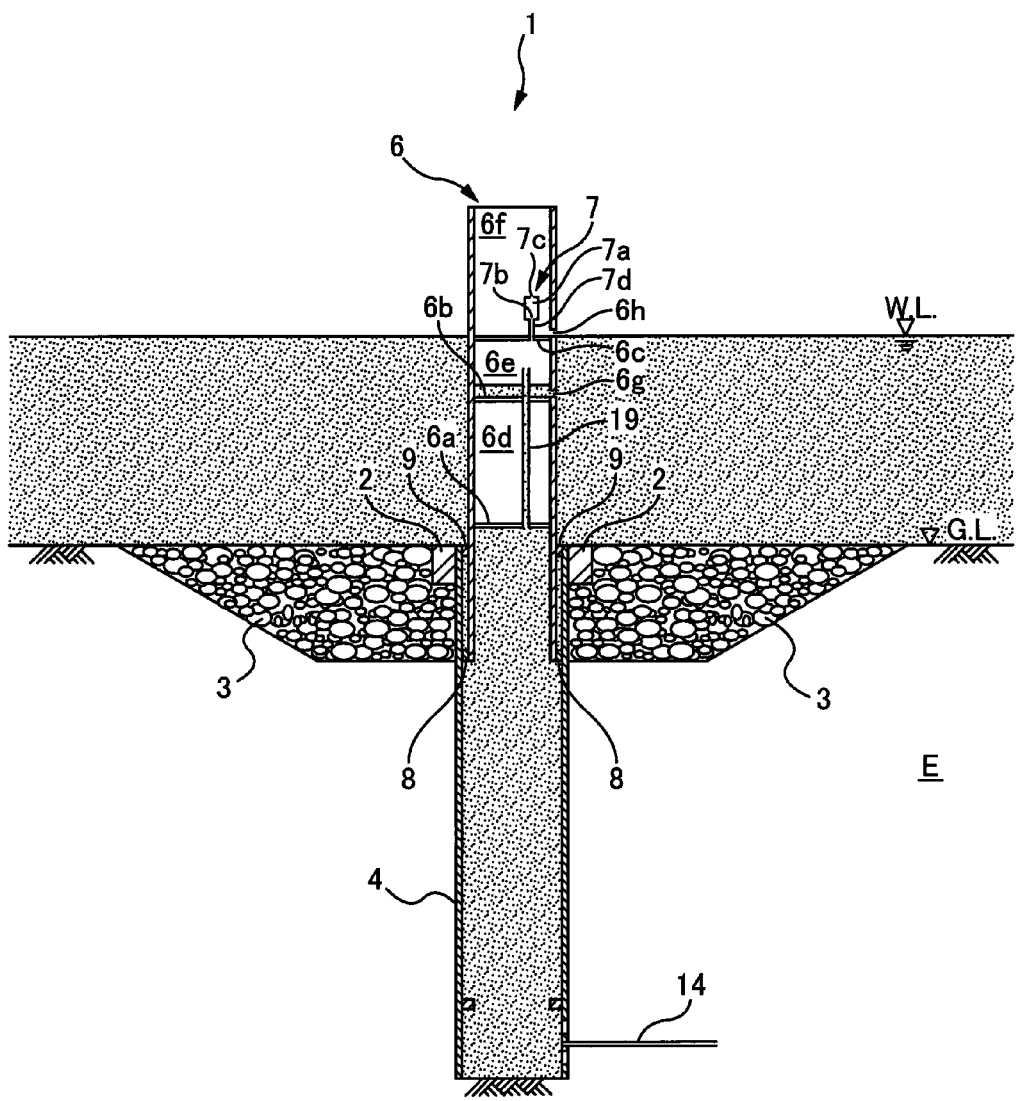
FIG. 9 is a diagram of a movable breakwater in a raised/lowered state.

As shown in FIG. 9, since the buoyancy tank 6d is provided at a location such that the top end of the buoyancy tank 6d is always below water level WL even when the buoyant steel pipe 6 is at a completely raised state, the buoyancy tank 6d is positioned in the water so that buoyancy due to gas inside the buoyancy tank 6d acts on the buoyant steel pipe 6. However, as explained above, this buoyancy is of a level such that the buoyant steel pipe 6 cannot rise by itself, thus with merely the buoyancy by gas inside the buoyancy tank 6d would only let the buoyant steel pipe 6 go down.

Additionally, the top end of the air chamber 6e is always at or below water level, so the whole air volume in the air chamber 6e is generating buoyant force.

Figure 10:
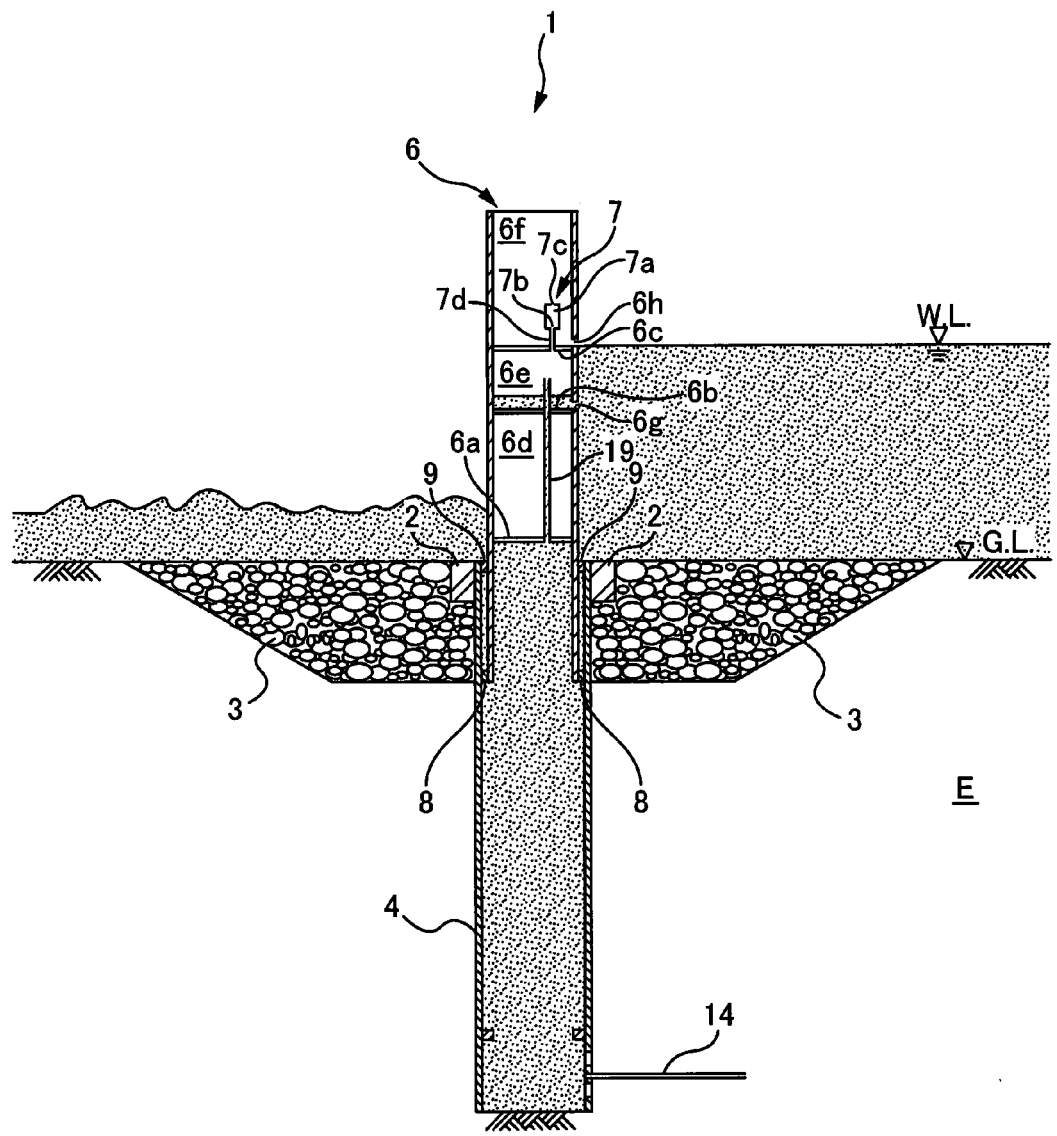
FIG. 10 is a diagram of a movable breakwater in a raised/lowered state.

As shown in FIG. 10, after the buoyant steel pipe 6 rises, the buoyant steel pipe 6 maintains a state emerging from the water in the harbor basin without going down even when the water level outside the harbor suddenly decreases due to an undertow of a tsunami.

In the following, the reason why buoyant steel pipe 6 can maintain a state emerging from the water will be explained. First, even when an undertow occurs and the water level outside the harbor decreases, water that flows toward outside the harbor is limited to an amount that flows out through the spaces made between the adjacent buoyant steel pipes 6 thus the water level at the harbor basin can be substantially maintained. At this time, the first hole 6g of the buoyant steel pipe 6 is provided to the side face on the harbor basin side, so the air chamber 6e is in communication with only the water of the harbor basin allowing the air pressure in the air chamber 6e to be largely effected by the water level on the harbor basin side. For such reason, buoyant force of the buoyant steel pipe 6 is maintained so that the buoyant steel pipe 6 keeps a state emerging from the water in the harbor basin without going down.

Further, when the water level outside the harbor decreases due to an undertow, water pressure oriented from the harbor basin toward outside the harbor, created by the head difference between the water level outside the harbor and the water level at the harbor basin side, acts on the upper portion of the buoyant steel pipe 6. This causes the buoyant steel pipe 6 to incline toward outside the harbor. And since the buoyant steel pipe 6 is in a state fit over the sleeved steel pipe 4, a large frictional force acts on the buoyant steel pipe 6 making it further difficult for the buoyant steel pipe 6 to go down and allowing to maintain the state emerging from the water in the harbor basin.

Here, the head difference between the water level outside the harbor and the water level at the harbor basin side at the time of an undertow causes water to flow from the harbor basin through the spaces between the buoyant steel pipes 6 and the sleeved steel pipes 4 to the outside of the harbor, however, the amount of such water is negligible and does not affect the changes in water level on the harbor basin side, and thus was ignored in the present embodiment.

Figure 11:
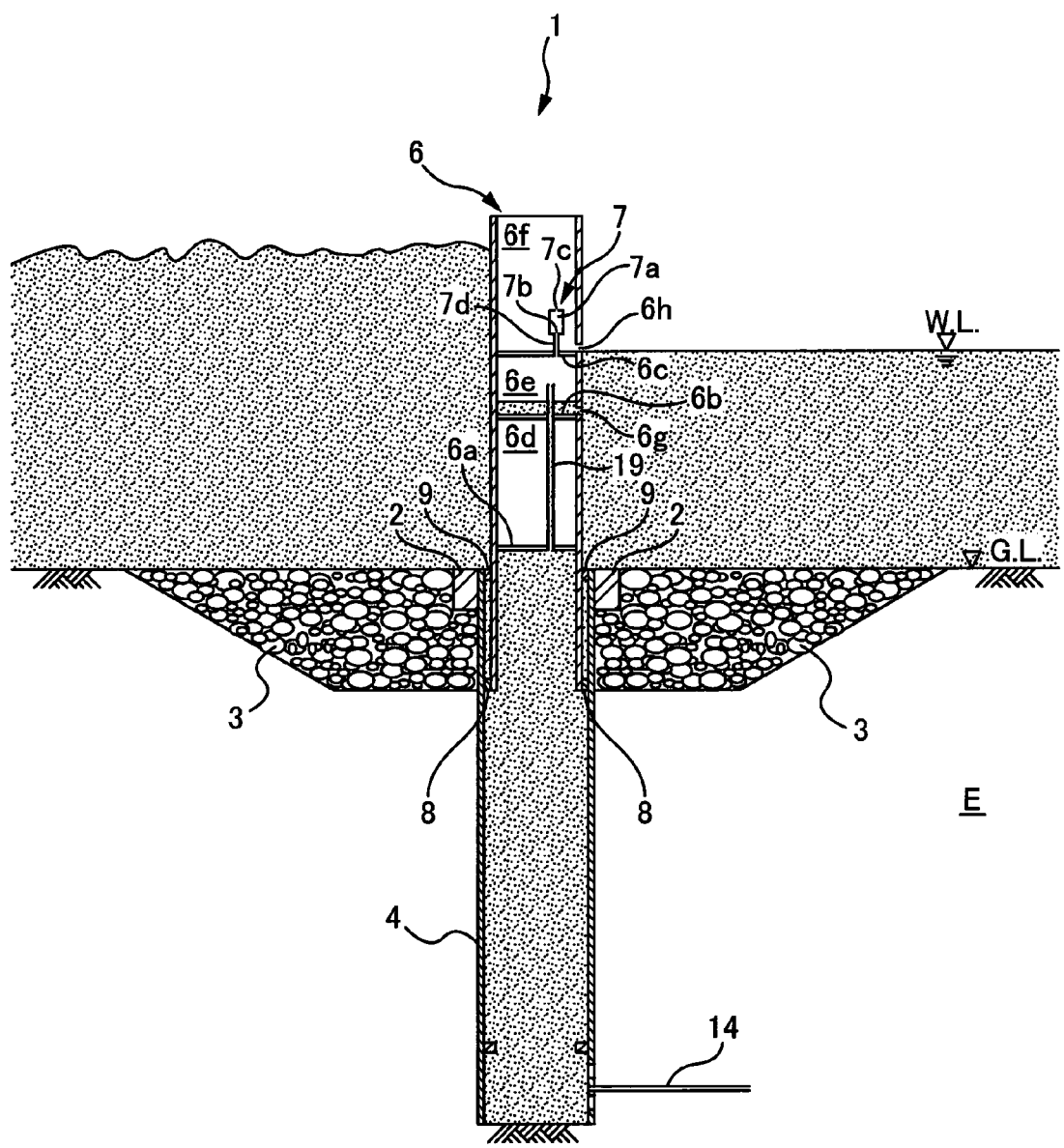
FIG. 11 is a diagram of a movable breakwater in a raised/lowered state.

As shown in FIG. 11, the buoyant steel pipe 6 maintains a state emerging from the water in the harbor basin even when the water level outside the harbor suddenly increases due to a run up wave after an undertow and therefore is capable of preventing a run up wave from flowing over the buoyant steel pipe 6 into the harbor basin. During the occurrence of a run up wave, buoyancy is secured by the water level at the harbor basin enabling the top end of the buoyant steel pipe 6 to maintain a predetermined level.

Figure 12:
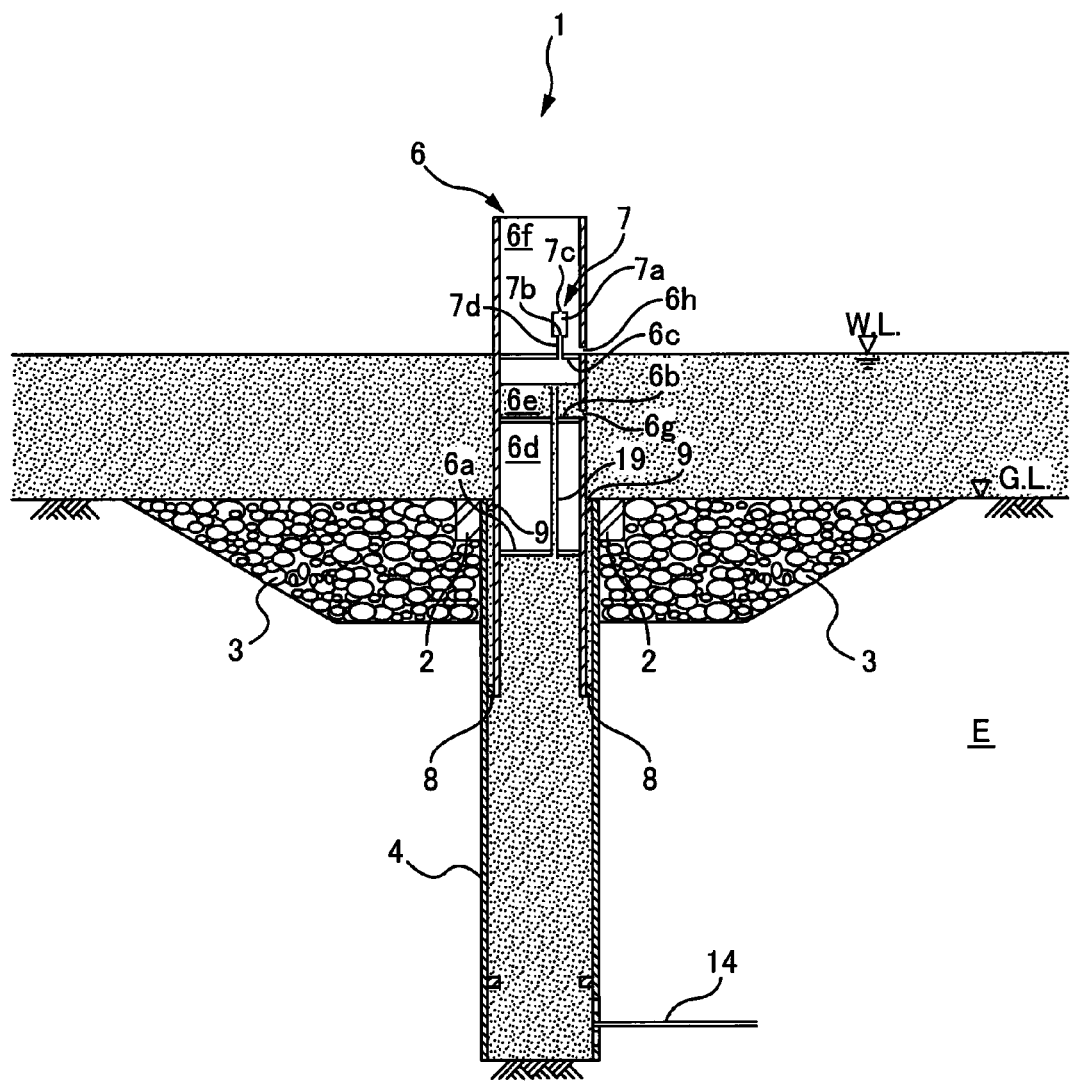
FIG. 12 is a diagram of a movable breakwater in a raised/lowered state.

As shown in FIG. 12, the on-off valve 7a is opened when the tsunami warning is cancelled. When the on-off valve 7a is open allowing communication between the interior of the air chamber 6e and the atmosphere, the compressed air in the air chamber 6e is exhausted into the atmosphere thus reducing the buoyant force generated by the compressed air stored in the air chamber 6e to almost nil. When the aforementioned resultant rising force becomes smaller than the weight of the buoyant steel pipe 6, the buoyant steel pipe 6 starts to go down.

Further when the air chamber 6e and the atmosphere comes into communication, water starts flowing in through the first hole 6g and into the air chamber 6e so that the interior of the air chamber 6e is gradually filled with water along with the lowering of the buoyant steel pipe 6.

Furthermore, when the buoyant steel pipe 6 continues to go down, water starts to flow through the second hole 6h into the open chamber 6f and at the same time water inside the air chamber 6e starts to flow through the exhaust feed pipe 7d and the on-off valve 7a and into the open chamber 6f. This water that has flown into the open chamber 6f acts as a ballast allowing the buoyant steel pipe 6 to go down quickly. Further, since the depth of in the air chamber 6e positioned in the surrounding water becomes deeper as the buoyant steel pipe 6 is lowered, the water pressure acting on the air chamber 6e increases. Therefore, the volume of the compressed air in the air chamber 6e decreasing as the buoyant steel pipe 6 goes down, allows to effectively reduce the buoyant force to facilitate the lowering of the buoyant steel pipe 6.

Figure 13:
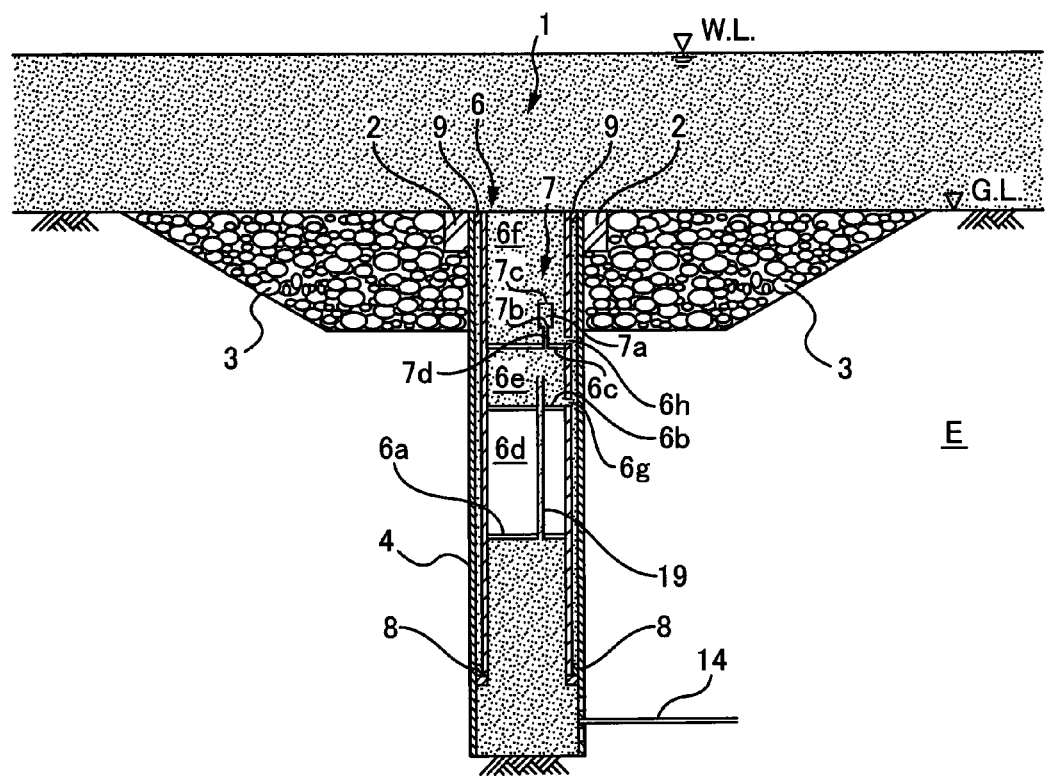
FIG. 13 is a diagram of a movable breakwater in a raised/lowered state.

In this way, the buoyant steel pipe 6 is lowered to be completely contained into the sleeved steel pipe 4, as shown in FIG. 13. Then when open water is created allowing ships to come and go freely into and out of the harbor, the on-off valve 7a is closed to shut the communication between the air chamber 6e and the water outside to be prepared for the next rising.

According to movable breakwater 1 of the present embodiment described above, the following effects can be achieved.

(1) The buoyant steel pipe 6 includes a buoyancy tank 6d filled with gas, and an air chamber 6e capable of storing pressured air therefore the buoyant steel pipe 6 can be raised with the buoyant force generated by the gas in the buoyancy tank 6d and buoyant force generated by supplying compressed air into the air chamber 6e. Further, the buoyancy tank 6d being provided in the buoyant steel pipe 6 allows the buoyant steel pipe 6 to be raised merely by supplying a small amount of compressed air from the shore-based pressure accumulator tank 13. Therefore, allows the buoyant steel pipe 6 to be raised in a short period of time.

(2) The air chamber 6e is provided at a location such that the top end of the air chamber 6e is always below water level WL regardless of whether or not the buoyant steel pipe 6 is raised or lowered. Therefore, buoyancy by the whole air chamber 6e acts on the buoyant steel pipe 6 since the entire air chamber 6e is positioned at a location below the water level.

(3) The top end of the buoyancy tank 6d is provided at a location such that the top end of the buoyancy tank 6d is always below water level WL regardless of the raised/lowered position of the buoyant steel pipe 6. Therefore, buoyancy by gas inside the buoyancy tank 6d always acts on the buoyant steel pipe 6 even when the buoyant steel pipe 6 is in a state emerging from the water at its uppermost position.

(4) More buoyancy can be obtained in the case the air chamber 6e is located above the buoyancy tank 6d than in the case the air chamber 6e is located below the buoyancy tank 6d because the volume of compressed air in the air chamber 6e is increased. The reason for this is because the water pressure acting on the air chamber 6e provided above the buoyancy tank 6d is lower than the water pressure acting on the buoyancy tank 6d when the same volume of compressed air is supplied by the pressure accumulator tank 13. In other words, buoyancy can be obtained effectively because the air chamber 6e of the present invention is located above the buoyancy tank 6d.

(5) The open chamber 6f including the second hole 6h allows water in the buoyant steel pipe 6 to be discharged out from the second hole 6h when the buoyant steel pipe 6 rises and the upper portion of the buoyant steel pipe 6 emerges from the water. Further, when the buoyant steel pipe 6 is lowered, water can be made to flow through the second hole 6h and into the buoyant steel pipe 6.

(6) The air chamber 6e having a first hole 6g on a harbor basin side face of the buoyant steel pipe 6, allows the air chamber 6e to be in communication with the water in the harbor basin with the air pressure in the air chamber 6e being largely affected by the water level at the harbor basin side. In this way, the buoyant steel pipe 6 can maintain a state emerging from the water as in the case before an undertow occurs even when the water level at the outside the harbor decreases due to an undertow of a tsunami and the like. Therefore water that flows out toward the outside the harbor is limited to an amount that flows through the space created between the adjacent buoyant steel pipes 6, so the water level at the harbor basin side decreases very little even when the water level outside the harbor decreases by an undertow.

(7) When the protruding portion to the buoyant steel pipe 8 rises along with the rising of the buoyant steel pipe 6 to abut against the protruding portion to the sleeved steel pipe 9, protruding portion to the sleeved steel pipe 9 restricts the protruding portion to the buoyant steel pipe 8 from rising any further thus stopping the buoyant steel pipe 6 from rising and preventing the buoyant steel pipe 6 from sliding out as well.

(8) Since the protruding portion to the buoyant steel pipe 8 and the protruding portion to the sleeved steel pipe 9 are detachable from the buoyant steel pipe 6 and the sleeved steel pipe 4, respectively, the protruding portions 8, 9 can be exchanged in an unlikely event in which the protruding portions 8, 9 were to deteriorate or break due to abrasion and the like.

(9) When the pressure accumulator tank 13 is activated to exhaust compressed air into the water in the sleeved steel pipe 4, the compressed air rises up the water in the buoyant steel pipe 6 to be stored in the air chamber 6e. Since the feed pipe 14 that feeds compressed air and the air chamber 6e are not connected at this time, in an event the feed pipe 14 breaks while in a state connected to the air chamber 6e, the possibility of compressed air in the air chamber 6e leaking out from the damaged part allowing the buoyant steel pipe 6 to go down as in conventional cases, can be prevented.

(10) Since the air chamber 6e can communicate with the atmosphere by opening the on-off valve 7a, compressed air in the air chamber 6e can be exhausted outside the buoyant steel pipe 6 to allow the lowering of the buoyant steel pipe 6 emerging from the water.

(11) Since the buoyant steel pipe 6 includes a buoyancy tank 6d that has gas hermetically sealed therein, gas is not forced under pressure by water when the buoyant steel pipe 6 is lowered. Therefore, water in buoyant steel pipe 6 is discharged of an amount equivalent to the volume of the buoyancy tank 6d along with lowering of the buoyant steel pipe 6. And this discharged water flows quickly through the spaces between the buoyant steel pipes 6 and the sleeved steel pipes 4 toward the harbor basin and the outside the harbor, thus allowing to generate jet flows. And with the jet flows, sand, stones or the like existing between the buoyant steel pipes 6 and the sleeved steel pipes 4 can be removed.

Figure 14:
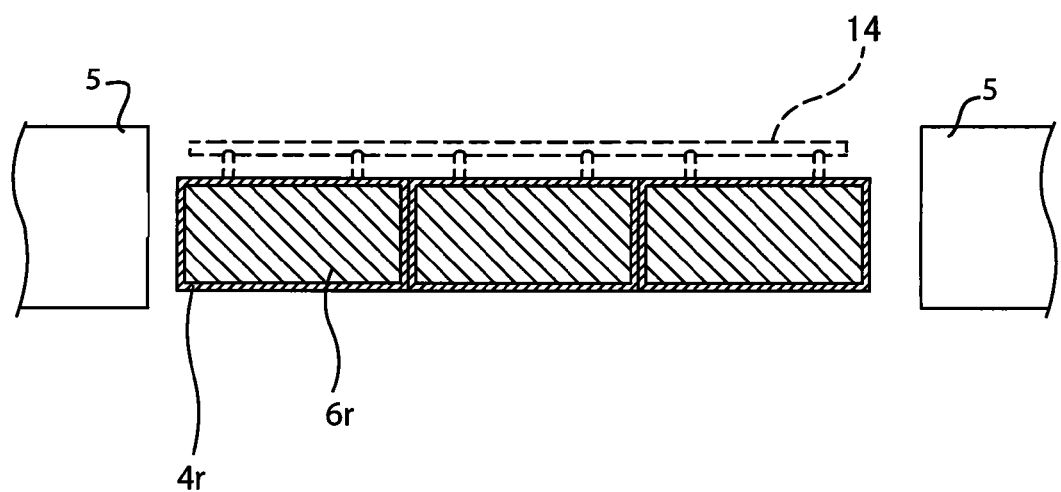
FIG. 14 is a diagram of another embodiment of a buoyant steel pipe.

Note that in the present embodiment, description was given in a case where a steel pipe having a circular section was used as the buoyant steel pipe 6 of the movable breakwater 1, however, the shape is not limited to such and for example, a steel pipe with a rectangular section can be used. In such case, a steel pipe with a rectangular section includes those with a width (diameter) larger than the height as in the case of a steel pipe with a box-like section. A planar diagram of a movable breakwater using this box-like steel pipe is shown in FIG. 14, including rectangular buoyant steel pipe 6r and rectangular sleeved steel pipe 4r.

Further in the present embodiment, description was given in the case the movable breakwater 1 was set in the sea, however, the location is not limited to such and can be set at, for example, a mouth of a river and the like.

REFERENCE SIGNS LIST

1 MOVABLE BREAKWATER
2 CONCRETE FOUNDATION
3 FOOT PROTECTION ROCKS
4 SLEEVED STEEL PIPE
4r RECTANGULAR SLEEVED STEEL PIPE
5 QUAY
6 BUOYANT STEEL PIPE
6a, 6b, 6c PARTITION WALL
6d BUOYANCY TANK
6e AIR CHAMBER
6f OPEN CHAMBER
6g FIRST HOLE
6h SECOND HOLE
6r RECTANGULAR BUOYANT STEEL PIPE
7 EXHAUST MEANS
7a ON-OFF VALVE
7b, 7c PORT
7d EXHAUST FEED PIPE
8 PROTRUDING PORTION TO BUOYANT STEEL PIPE
9 PROTRUDING PORTION TO SLEEVED STEEL PIPE
12 AIR CHARGING MEANS
13 PRESSURE ACCUMULATION TANK
14 FEED PIPE
19 PENETRATION PIPE
E GROUND UNDER THE WATER BED
WL WATER LEVEL
GL WATER BED

The invention claimed is:

1. A movable breakwater including a plurality of sleeved steel pipes aligned parallel to each other on a straight line and inserted vertically, said plurality of sleeved steel pipes penetrating a bottom of a water into a ground under the water with top faces of said sleeved steel pipes opened to the water, and buoyant steel pipes inserted into the respective sleeved steel pipes in a manner capable of being raised and lowered, the movable breakwater comprising:

an air chamber provided in each of the buoyant steel pipes at a position so that an upper end of said air chamber is always under water level while each of the buoyant steel pipes is rising from a lowest position to a completely raised position regardless of the vertical position of the buoyant steel pipes, allowing water to come in and go out as well as being capable of storing compressed air;

a buoyancy tank provided at a position under the air chamber in each of the buoyant steel pipes and at a position so that an upper end of said buoyancy tank is always under water level regardless of a vertical position of the buoyant steel pipes, and having gas hermetically sealed in said buoyancy tank;

an air charging means for supplying compressed air to the air chamber; and an exhaust means positioned above the air chamber in each of the buoyant steel pipes, for exhausting compressed air in the air chamber out of the buoyant steel pipes, wherein the buoyant steel pipes are raised to emerge from water by buoyancy generated by supplying compressed air to the air chamber by the air charging means and buoyancy of gas in the buoyancy tank.

2. The movable breakwater according to claim 1, wherein the air chamber is provided under a top end of each of the respective buoyant steel pipes and the buoyant steel pipes have a hole, for discharging water that flows in from the top of the buoyant steel pipes, on a side face of the buoyant steel pipes and above the air chamber.

3. The movable breakwater according to claim 1, wherein the respective buoyant steel pipes are to be placed at a sea or a mouth of a river, and a hole, for discharging water in the air chamber is provided on a harbor basin side or an upstream side face of the buoyant steel pipes, at a bottom part of the air chamber.

4. The movable breakwater according to claim 1, wherein the respective buoyant steel pipes include at a bottom end part of an outer circumference thereof a plate-like protruding portion to the respective buoyant steel pipes, of a thickness thinner than a space formed between an outer circumferential face of the buoyant steel pipes and an inner circumferential face of the respective sleeved steel pipes, and each of the respective sleeved steel pipes includes at a top end part of an inner circumference thereof a plate-like protruding portion to the respective sleeved steel pipes, of a thickness thinner than the space formed between the outer circumferential face of the respective buoyant steel pipes and the inner circumferential face of the sleeved steel pipes.

5. The movable breakwater according to claim 4, wherein the protruding portion to the respective buoyant steel pipes and the protruding portion to the respective sleeved steel pipes are detachable from the buoyant steel pipes and the sleeved steel pipes, respectively.

6. The movable breakwater according to claim 1, wherein the air charging means includes
   a plurality of feed pipes connected to a side face at a bottom end of the respective sleeved steel pipes in a manner such that one end of said feed pipes does not protrude into the sleeved steel pipes, to feed through said feed pipes compressed air into the sleeved steel pipes, and
   a supply device connected to the respective feed pipes, to supply compressed air,
   the compressed air supplied by the supply device being supplied through the feed pipes to be discharged to water in the sleeved steel pipes and supplied to the air chamber.

7. The movable breakwater according to claim 1, wherein the exhaust means includes
   an on-off valve, and
   a feed pipe connected to one port of the on-off valve for communication with an interior of the air chamber, wherein
   the air chamber communicates with an atmosphere by opening the on-off valve.

8. A method of operating a movable breakwater including a plurality of sleeved steel pipes aligned parallel to each other on a straight line and inserted vertically, said plurality of sleeved steel pipes penetrating a bottom of a water into a ground under the water with top faces of said sleeved steel pipes opened to the water, and buoyant steel pipes inserted into the respective sleeved steel pipes in a manner capable of being raised and lowered,
   an air chamber provided in each of the buoyant steel pipes at a position so that an upper end of said air chamber is always under water level while each of the buoyant steel pipes is rising from a lowest position to a completely raised position regardless of a vertical position of the buoyant steel pipes, allowing water to come in and go out from said air chamber as well as being capable of storing compressed air,
   a buoyancy tank provided at a position under the air chamber in each of the buoyant steel pipes and at a position so that an upper end of said buoyancy tank is always under water level while each of the buoyant steel pipes is rising from a lowest position to the completely raised position regardless of the vertical position of the buoyant steel pipes, and having gas hermetically sealed in said buoyancy tank,
   an air charging means for supplying compressed air to the air chamber; and
   an exhaust means positioned above the air chamber in each of the buoyant steel pipes, for exhausting compressed air in the air chamber out of the buoyant steel pipes, the method comprising
   raising the respective buoyant steel pipes to emerge from water by buoyancy generated by supplying compressed air to the air chamber by the air charging means and buoyancy of gas in the buoyancy tank.

9. The method of operating the movable breakwater according to claim 8, wherein
   the respective buoyant steel pipes include at a bottom end part of an outer circumference thereof a plate-like protruding portion to the buoyant steel pipes, of a thickness thinner than a space formed between an outer circumferential face of the respective buoyant steel pipes and an inner circumferential face of the sleeved steel pipes, and
   each of the respective sleeved steel pipes includes at a top end part of an inner circumference thereof a plate-like protruding portion to the respective sleeved steel pipes, of a thickness thinner than the space formed between the outer circumferential face of the respective buoyant steel pipes and the inner circumferential face of the sleeved steel pipes,
   the protruding portion to the respective buoyant steel pipes abutting against the protruding portion to the respective sleeved steel pipes, and the protruding portion to the respective sleeved steel pipes restricting the protruding portion to the respective buoyant steel pipes from rising any further to stop the rising respective buoyant steel pipes and prevent the respective buoyant steel pipes from sliding out as well.

10. The method of operating the movable breakwater according to claim 8, storing the respective buoyant steel pipes in each of the respective sleeved steel pipes by exhausting compressed air in the air chamber and reducing the buoyancy of the buoyant steel pipes.

11. The method of operating the movable breakwater according to claim 8, wherein rising speed of the respective buoyant steel pipes increases along with reduction in water pressure acting on compressed air in the air chamber to increase volume of the compressed air in the air chamber, with rising of the buoyant steel pipes.

12. The method of operating the movable breakwater according to claim 8, wherein lowering speed of the respective buoyant steel pipes increases along with increase in water pressure acting on compressed air in the air chamber to reduce volume of the compressed air in the air chamber, with lowering of the buoyant steel pipes.

* * * * *

UNITED STATES PATENT AND TRADEMARK OFFICE
CERTIFICATE OF CORRECTION

PATENT NO. : 8,915,672 B2  
APPLICATION NO. : 13/376146  
DATED : December 23, 2014  
INVENTOR(S) : Hirofumi Inagaki et al.

Page 1 of 1

It is certified that error appears in the above-identified patent and that said Letters Patent is hereby corrected as shown below:

In item (73) of the title page, replace "Assignee:" with -- Assignees: -- and insert the following four additional Assignees:

-- Obayashi Corporation, Tokyo (JP); Independent Administrative Institution Port and Airport Research Institute, Yokosuka-shi (JP); Nippon Steel Engineering Co., Ltd., Tokyo (JP); TOA Corporation, Tokyo (JP) --

Signed and Sealed this  
Seventh Day of July, 2015

Michelle K. Lee  
*Director of the United States Patent and Trademark Office*